H. MAXIM.
AUTOMOBILE TORPEDO AND METHOD OF AND APPARATUS FOR ITS PROPULSION.
APPLICATION FILED MAR. 9, 1908.

1,014,014.

Patented Jan. 9, 1912.

H. MAXIM.
AUTOMOBILE TORPEDO AND METHOD OF AND APPARATUS FOR ITS PROPULSION.
APPLICATION FILED MAR. 9, 1908.

1,014,014.

Patented Jan. 9, 1912.
7 SHEETS—SHEET 2.

H. MAXIM.
AUTOMOBILE TORPEDO AND METHOD OF AND APPARATUS FOR ITS PROPULSION.
APPLICATION FILED MAR. 9, 1908.

1,014,014.

Patented Jan. 9, 1912.
7 SHEETS—SHEET 3.

H. MAXIM.
AUTOMOBILE TORPEDO AND METHOD OF AND APPARATUS FOR ITS PROPULSION.
APPLICATION FILED MAR. 9, 1908.

1,014,014.

Patented Jan. 9, 1912.

UNITED STATES PATENT OFFICE.

HUDSON MAXIM, OF HOPATCONG, NEW JERSEY.

AUTOMOBILE TORPEDO AND METHOD OF AND APPARATUS FOR ITS PROPULSION.

1,014,014. Specification of Letters Patent. Patented Jan. 9, 1912.

Application filed March 9, 1908. Serial No. 420,084.

*To all whom it may concern:*

Be it known that I, HUDSON MAXIM, of the borough of Hopatcong, county of Sussex, State of New Jersey, have invented a new and useful Improvement in Automobile Torpedoes and in Methods and Apparatus for Their Propulsion, which invention is fully set forth in the following specification.

The present invention relates to improvements in automobile torpedoes and in methods and apparatus for their propulsion with much greater speed and at longer ranges than heretofore. Heretofore torpedoes of this class have mainly been driven by compressed air used as a motive fluid actuating a turbine or other engine, which in turn drives screw propellers.

In order to carry a sufficient quantity of air it is necessary to subject it to a very high degree of compression. Pressures amounting to 2,250 pounds to the square inch being common, a heavy, strong and expensive container, or air flask, is required. As the entire weight of the torpedo must not exceed the weight of the water displaced by it, the propelling machinery must necessarily be made very light, while the high explosive charge carried in the warhead is much smaller than is desirable.

In order to effectually utilize the highly compressed air it is necessary to heat it in its passage from the air flask to the engine or turbine; but notwithstanding the large quantity of compressed air carried and the high compression to which it is subjected, and the fact that it is heated before using, the speed and range of all compressed air-driven torpedoes fall far short of being as great as is needed to meet demands and exigencies of torpedo warfare. By means of the present invention the air flask is done away with, and in its place a simple casing is employed, merely strong enough and thick enough for structural rigidity, thereby saving a large expense as well as saving a large amount of weight, enabling the employment of many new and useful improvements capable of producing very superior results to anything heretofore accomplished in the propulsion of torpedoes, as well as enabling the carrying of a very much larger charge of high explosive in the warhead, all as hereinafter described and explained.

In carrying out the invention, the usual cigar-shaped torpedo casing is preferably employed, the principal divisions of the torpedo being—the war-head, the main body and the after-body. In the main body or central casing is mounted an apparatus adapted to the burning of a self-combustive fuel, a combustion chamber or steam generator for evaporating water by the heated products of combustion of such fuel, a fuel container, an automatic water supply adapted to take water from the sea and conduct it to the combustion chamber or steam generator, together with a controlling valve for regulating the pressure within the combustion chamber or steam generator, and thereby to control the rate of combustion of the self-combustive fuel and the quantity of products of combustion and steam generated and the temperature thereof, which are allowed to escape through the controlling valve and thence to a propelling means, such for instance as to drive a turbine or other engine, or to be employed in a suitable manner for jet propulsion. The combustion chamber or steam generator is provided also with a safety valve adapted to be opened with great quickness, either by excessive pressure within the combustion chamber or steam generator, or by excessive heat therein.

Within the steam generator means, such as a series of baffle plates, are provided, whereby the water, on entering the combustion chamber, is taken up in the swirl of hot gases or flame of the burning motorite or self-combustive material and forced through the series of baffle plates or atomizer, which serves both to blow the water into a fine spray and to convert it into steam. The water, being blown into a fine spray by the blast of heated gases, is made to present an enormous area per unit of weight to the heated products of combustion, and, therefore, is thereby immediately converted into steam, with which the gaseous products of the combustion of the fuel is intimately mixed.

The controlling valve is of the piston or plunger type, and is adapted to receive pressure directly from the combustion chamber at both ends of the piston or plunger; but the pressure on the one end which forms the valve seat, being exerted upon a larger area than that exposed to the pressure at the other end of the piston, the valve is forced open by the unbalanced pressure, thereby permitting the free passage of the products of combustion and steam through the valved orifice, to be conducted to and utilized by the torpedo propelling means. The controlling valve is normally held firmly to its seat by the tension of a coiled spring adjusted to exert a predetermined pressure against the valve.

The motorite or self-combustive fuel is made in the form of solid bars of seven inches or more in diameter, and of a length suited to supply sufficient gaseous products of combustion with the steam to obtain the maximum range desired; the motorite bars being forced and sealed into thin steel tubes. Means are provided for the convenient insertion and removal of the motorite-containing tube, or tubes, the use of a single tube being chosen for illustration. When in position in the torpedo, the motorite tube is surrounded by a water jacket; two water reservoirs being provided above the forward end portion of the water jacket, to which the water jacket is connected by a suitable conduit. Both water reservoirs are directly connected with the combustion chamber or steam generator by a pipe or conduit, which branches to each of the water reservoirs by an independent pipe or conduit adapted to be opened and closed by a suitable automatically operated valve.

The water reservoirs are so constructed that one of them is constantly under the pressure of the combustion chamber, while the other is automatically refilling from the sea. Each water tank is provided with a float connected with and adapted to operate a valve gear which, as soon as the tank is filled with water, causes the combustion chamber pressure to be admitted to the filled tank simultaneously with its being opened to the supply conduit, quickly followed by the pressure being shut off from the other tank, the pressure already within it to be released into the sea through an exhaust valve, and its outlet to the supply conduit closed; the operation of the valves being effected by energy stored up in springs by the reciprocal movements of a piston operating in connection with both tanks under the alternating unbalanced pressure between the tanks. Water from the tank or reservoir under pressure is allowed to flow by gravity into and through the water jacket surrounding the motorite tube into the combustion chamber or steam generator.

In the after-body of the torpedo are mounted the usual turbines or engines, when such are employed, together with the gyroscope, not shown, adapted to be driven by steam pressure, for which purpose a certain proportion of the mixed steam and products of combustion is utilized. Very good results have been obtained from the direct use of mixed steam and products of combustion in jet propulsion, thereby doing away with the use of engine, turbines and propellers.

The motive fluid—that is to say, the mixed steam and products of combustion, when used for jet propulsion, are conducted to and through a relatively large number of orifices into and through trumpet-shaped outlets or expansion conduits opening to the sea, with their mouths arranged circumferentially around the after body of the torpedo, whereby a certain proportion of the energy in the motive fluid is converted into momentum, thereby reacting to some extent upon the torpedo to force it through the water. But the object of expanding the motive fluid is mainly to cause the escaping steam and gases to exert their pressure over a greater surface of the water and thereby simultaneously to react over a correspondingly large surface of the torpedo, to force it forward through the water.

Steam employed alone does not serve so well for jet propulsion, for the reason that it condenses so quickly upon the cold surface of the water, but when a mixture of steam and products of combustion containing a large proportion of fixed gases is employed, some of the steam condenses in contact with the cold surface of the water leaving a stratum of fixed gases between the uncondensed outgoing steam and the water, so that always there is a thin film or layer of fixed uncondensable and heated gases between the escaping steam and the water wall, so that the uncondensed steam is enabled in expanding to exert great pressure between the water wall and a corresponding area of the torpedo to force it along through the water.

As the torpedo is traveling at high speed through the water, the water wall against which the steam pressure is exerted is quite fixed and rigid, for the reason that new water is constantly being supplied to that which is forced away by the escaping motive fluid.

Having thus given a general description of the improved torpedo and improved apparatus and method constituting means for its propulsion, a detailed descripton of the same will now be given with reference to the accompanying drawings, in which.

Figure 1:
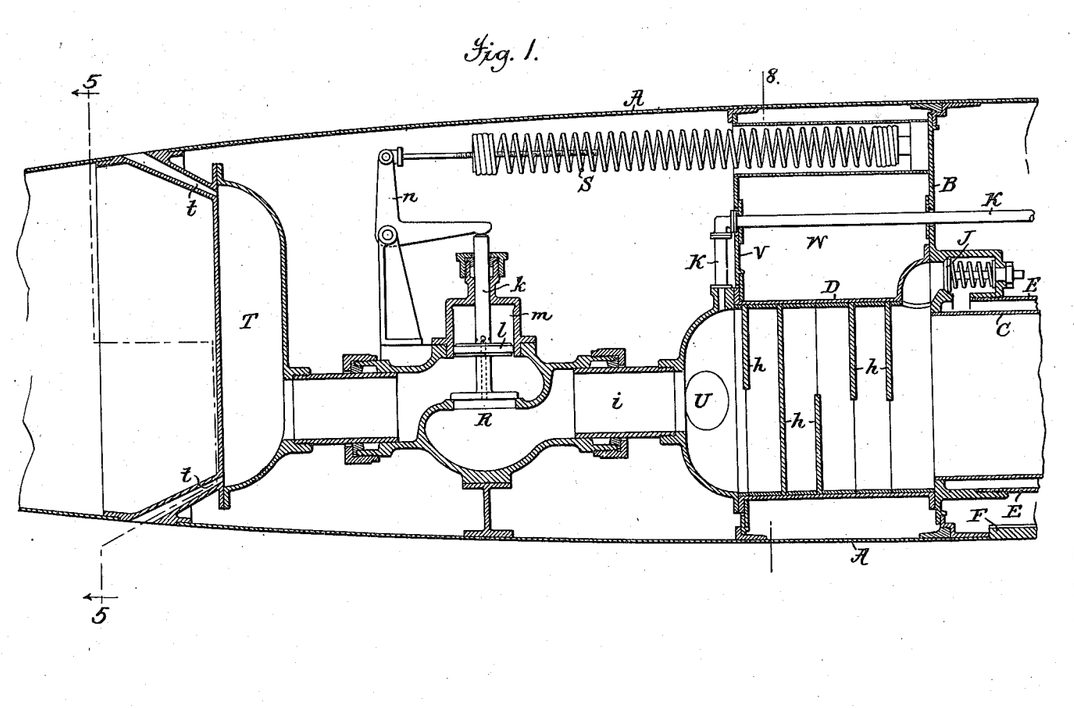
Figures 1 and 2 are longitudinal, vertical sectional elevations of the opposite end portions of the main or central body of the torpedo, the intermediate portion, not shown, being taken up by the continued length of the tube containing the self-combustive material and surrounding water jacket that are shown in section and in elevation respectively in said two figures.
Figure 2:
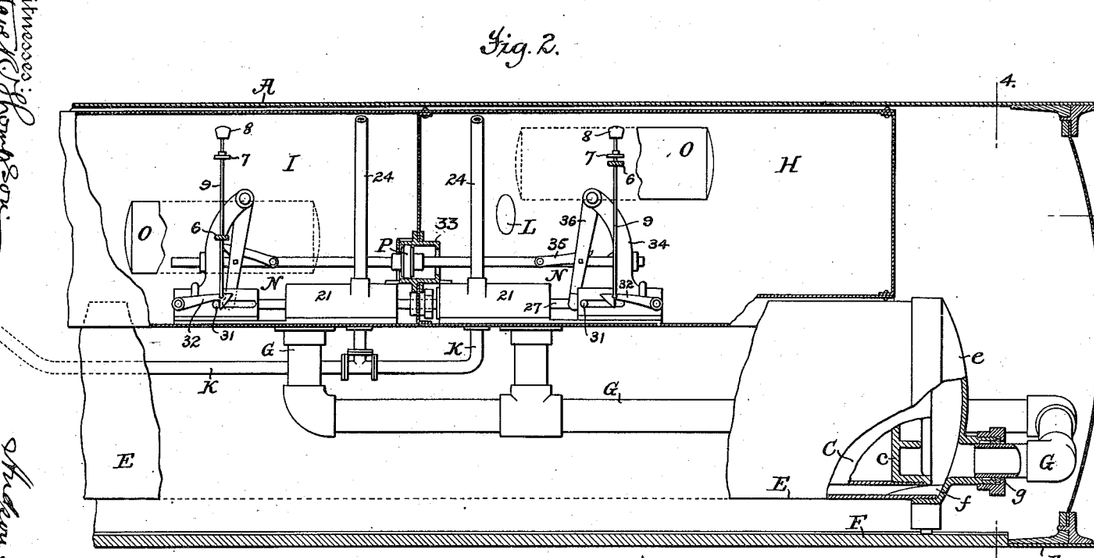

The torpedo casing A, is of the usual or other preferred form, the extreme end portions of the central or main body of which is illustrated in Figs. 1 and 2, wherein a transverse partition or bulk-head B supports one end of a tube C containing the self-combustive material or fuel and a steam generator or combustion chamber D. The casing is rendered capable of being broken or parted at one side of the partitions to expose the combustion chamber and permit its being unbolted from the partition to allow the withdrawal or insertion of the fuel-containing tube C. This tube C extends concentrically within another tube, E, which is also supported at one end by the partition B and provides the tube C with a surrounding annular water jacket preventing said tube from becoming unduly heated and at the same time serving as a conduit for the water supplied to the combustion chamber. The opposite end of the water jacket tube E, Fig. 2, is provided with a closing head e, which rests upon and is guided in the expansion movement of the tube by a longitudinal keel-plate F supported by the casing; and the contiguous end of the fuel-containing tube is provided with a closed head c and is supported concentric with the outer tube by a ledge f, up the inclined edge of which the end of the tube moves as it is pushed into place.

The water jacket together with a pipe G form a conduit for a proper and constant supply of water from the supply tanks H, I, to the combustion chamber or generator D, the entrance to that chamber being controlled by a suitable spring-pressed valve J. This valve, until the self-combustive material is ignited, or until a proper pressure occurs in the combustion chamber, rests normally closed holding the water in the water jacket, but as soon as pressure is formed in the combustion chamber and the material is ignited, the valve automatically opens to permit the flow of water into the chamber to mingle with the heated products of combustion of the fuel to be thereby converted into steam and form the motor fluid with which the torpedo is propelled or moved through the water. The pipe G is connected by two branches with the bottom of the tanks H and I, and the joint between the pipe and the head e is a packed slide-joint g, to permit of the expansive movement of the tube with respect to the pipe. In addition to the water conduit the tanks are each connected with the combustion chamber D by a pipe K, by which the pressure in said chamber is admitted to the water tanks so that the pressures are counterbalanced and the flow of water therefrom had by gravity.

Figure 3:
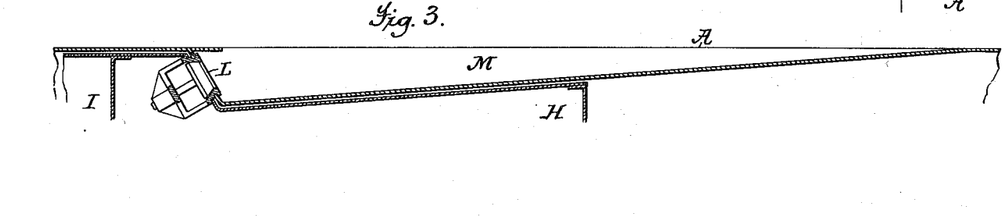
Fig. 3, is a longitudinal horizontal section on the line 3, of Fig. 2, showing particularly one of the runways and valves for supplying sea water to the tanks.

Automatic means are provided in the water tanks by which, while one tank is supplying water to the combustion chamber the other tank is filling with sea water, and as soon as the second tank is filled it supplies the water while the first-named tank is filling again. Each tank is provided with a sea valve L, one of the valves being shown in Fig. 3, mounted in the inclined face at the end of a long tapering runway M, formed in the longitudinal side of the torpedo casing; the valve for the other tank being of similar construction is situated upon the opposite side of the casing. Other means for inclosing a proper entrance of the sea water into the tanks may be obviously employed.

The feed of water to the combustion chamber alternately from the tanks as one becomes filled and the other empty or nearly so, is governed by valve gears or devices N, of similar construction, arranged one in each tank, the valves of which are connected to move in unison in connection with independent floats O, one in each tank, and a single pressure-operated piston P, common to an actuating spring of each valve gear. The valve in each tank is arranged to control the flow of water to the pipe G, the admission of the combustion chamber pressure while supplying water, and the escape of such pressure to the sea when filling with water, the construction and operation being such that as soon as one tank becomes filled with water it is opened to the supply pipe G, while the valve in the other tank is moved to shut off the water from that tank, so that there is no stoppage in the supply of water to the combustion chamber. The pressure-operated piston P, also, is connected to compress a spring in each tank, that is arranged when the tank becomes filled with water to be tripped so as to exert its expansive force in moving both of the valves to their changed positions. The movement of the piston for this purpose is had by the admission of pressure to the filled tank, which occurs simultaneously with the exhaust of the pressure in the empty or nearly empty tank. The release of the compressed valve actuating spring is had by a suitable connection with the float operable when the tank has become filled.

In the drawings, Fig. 2, the tank H has become filled with water and the float has just released the actuating spring therein to cause the valve in that tank to move to its water feeding position. The pressure has simultaneously been admitted to the filled tank H and cut off from the tank I, and exhaust has been opened to allow the escape of pressure from that tank. The pressure operated piston also, under the force of the pressure admitted to the filled tank and the opening of the exhaust in the tank I, has moved to compress the actuating spring in said tank I, ready as soon as tripped by the rising float therein to move the valves in the opposite direction.

Figure 4:
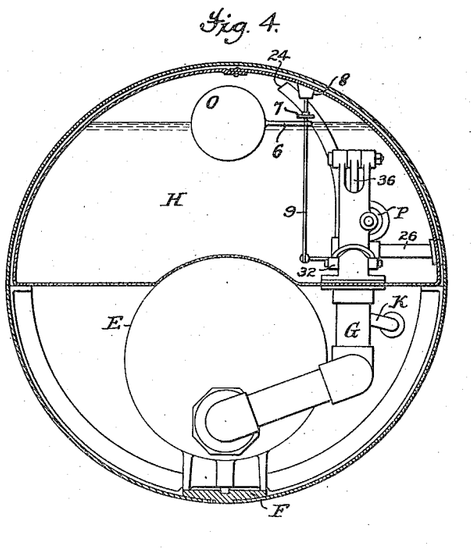
Fig. 4, is a vertical cross section taken approximately on the line 4, of Fig. 2 with the forward water tank in section to expose the valve gear.
Figures 6, 7:
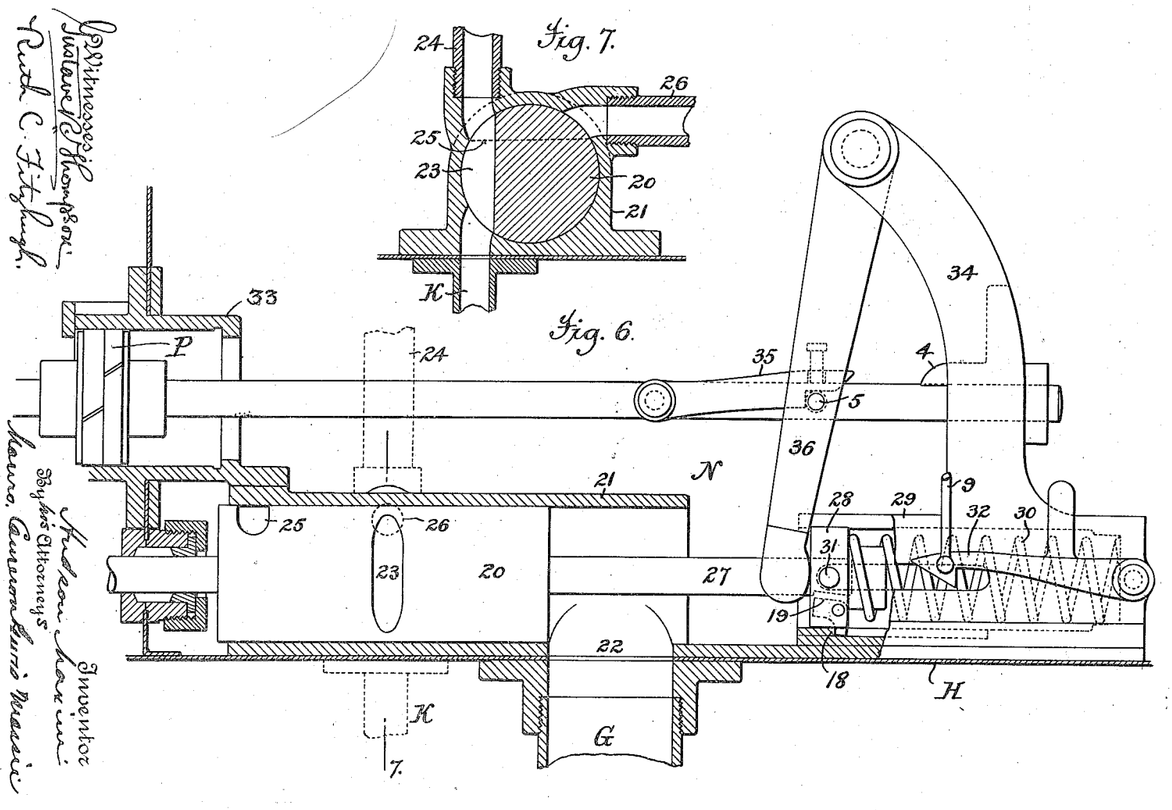
Fig. 6, is an enlarged sectional elevation of the valve gear in one of the water tanks.
Fig. 7 is a cross section on the line 7, of Fig. 6.

The construction of each valve device will be best understood by a detailed description of the enlarged views, Figs. 6 and 7. The valve 20 is of the plunger type sliding in a casing 21, and controls the water orifice 22 of the pipe G; is supplied with a channel 23 for connecting the pressure supply pipe K with a standpipe 24 leading from the valve casing to the upper part of the tank, as indicated in Figs. 2 and 4; and is further supplied with another channel 25, for connecting the standpipe 24 with an exhaust pipe 26, leading to the outside of the torpedo casing. The valve stem 27 is detachably connected to a head 28 sliding in a casing 29 and borne upon by an actuating coiled spring 30 therein. The head carries a pawl 19 arranged to engage a shoulder on the valve stem and to be released therefrom in striking a fixed abutment 18. The head has a stud 31 extending outward through a longitudinal slot or slots in the casing and arranged, when the piston P has moved to compress the spring, to be caught and held by a latch or latches 32 pivoted to the casing and having a link or rod 9 extending upward to a guide 8 at the top of the tank. This rod has a collar 7 fixed near its upper end arranged to be met by an arm 6 carried by the float O and freely sliding on the rod and thereby to raise the rod and lift the latch to free the valve therefrom and allow the expansive force of the spring to move the valve to its open position shown in Figs. 6 and 7. The reverse movement of the valve to close the water orifice 22, shut off the supply of pressure to the tank through channel 23 and pipe 24, and open or exhaust the pressure in the tank to the sea through pipe 24, channel 25 and pipe 26, is effected by the release of the compressed actuating spring in the other tank. The piston P, which acts to compress the actuating spring in each tank, is mounted in an open ended cylinder 33 that is situated in the partition between the two tanks H, I, so that one side of the piston is exposed to one tank and the opposite side to the other tank. The piston has a rod extending into each tank, each outer end of the rod being guided by a bearing provided on a bracket 34 rising from the spring-containing casing 29. The piston rod near each end carries a pivoted arm or pawl 35 arranged to contact with a stud 5 projecting from a lever 36 pivoted to and depending from the bracket 34, with its lower end forked to straddle the valve stem 27 just behind the head 28. This construction is such that when the piston is moved to the right in the Figs. 2 and 6, the actuating spring in one tank is compressed until its head is caught and held by the engagement of the latch 32 with its stud 31. In this movement the piston rod in the other tank has brought the pivoted arm or pawl 35 at that end into engagement with the stud 5 of the lever therein ready to move the actuating spring in said tank in a like manner when the piston is forced to the left. The free end of the pivoted arm 35 is inclined to meet an incline 4 on the bracket so that at or near the end of the stroke of the piston and when the latch has caught the stud 31 the arm is lifted from the lever stud 5, freeing the lever from the piston rod so that thereafter when the latch 32 is raised by the float reaching its uppermost position to release the actuating spring the connecting lever 36 will be free to move to the left independent of the piston and piston rod.

The pawl 19 couples the spring-actuated head 28 to the valve stem 27 when released to move the valves; and to free the valve stem from the pawl to allow the valve to move irrespective of the head and its spring, the pawl at the end of the operative stroke of the spring is tripped by striking the abutment 18 to release the valve stem. When the spring has been compressed, the pawl is reëngaged with the shoulder of the valve stem by striking another abutment at the end of its travel.

Figure 8:
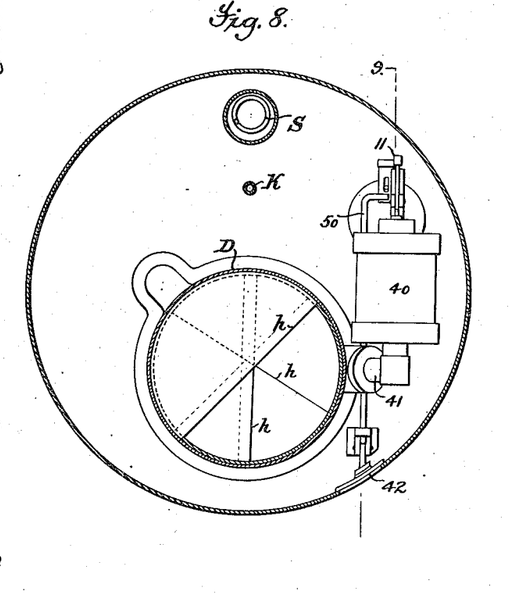
Fig. 8, is a cross sectional elevation taken on the lines 8, of Figs. 1 and 9, showing the baffle plates of the steam generator and an elevation of the igniter for the self-combustive material.

The combustion chamber or steam generator D supports a plurality of baffle plates $h$, extending as indicated in Figs. 1 and 8 partially across the chamber and together forming a circuitous or spiral conduit for the products of combustion and steam, whereby the two are thoroughly and intimately mixed, and any free water carried thereby effectually and quickly converted into steam to pass onward as the motor fluid for driving the torpedo through the water.

Figure 5:
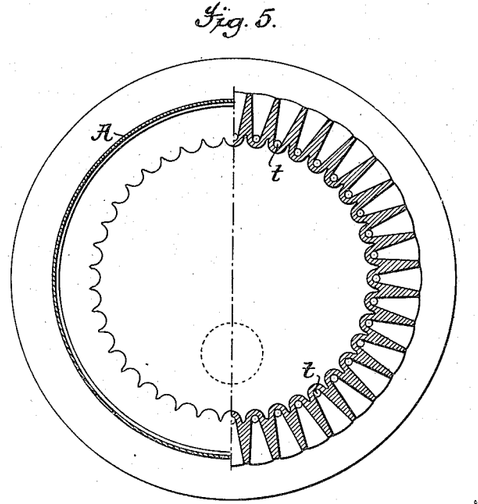
Fig. 5, is a vertical cross section taken half through the jet nozzles and half through the torpedo casing in rear of the nozzles, approximately on the line 5, of Fig. 1.

The motor fluid passes from the combustion chamber by a pipe $i$ to a controlling valve R, the valve stem $k$ of which is provided with a piston $l$, mounted in cylinder $m$. The valve stem is centrally perforated to admit the motor fluid pressure to the upper side of the piston, but as the valve orifice is slightly larger in area than the piston, the unbalanced pressure against the valve is sufficient to raise the valve against the pressure of a suitable spring S acting through the interposition of a bell crank $n$, one end connected to the spring and the other bearing against the end of the valve stem. The spring is adjusted to exert a predetermined pressure upon the valve, so that the valve shall open only when the pressure of the motor fluid reaches a definite point and will immediately close should the pressure from any cause drop below that point, and thereby maintain the needed pressure in the combustion chamber to cause a uniform and required rate of combustion of the self-combustive fuel. After passing the controlling valve R the motor fluid enters a manifold T from which lead a number of jet orifices $t$ extending into inclined trumpet-shaped outlets opening to the sea with their mouths arranged circumferentially around the after body of the torpedo as seen in Figs. 1 and 5. In addition to the impact of the jets of motor fluid against the sea, the shape of the jet outlets permits an expansion of the motor fluid in passing outward so that a portion of its energy is converted into momentum, which reacts to some extent upon the torpedo to force it through the water.

Means are provided for automatically igniting the self-combustive material immediately the torpedo is launched from the torpedo tube and by the act of the torpedo striking the water; and these means also preferably include a setting device operated by the pressure used to launch the torpedo. The automatic igniter also supplies an initial pressure in the combustion chamber sufficiently high to insure the burning of the self-combustive fuel when ignited, as well as to open the water supply valve J and supply pressure to the filled water tank.

Figure 9:
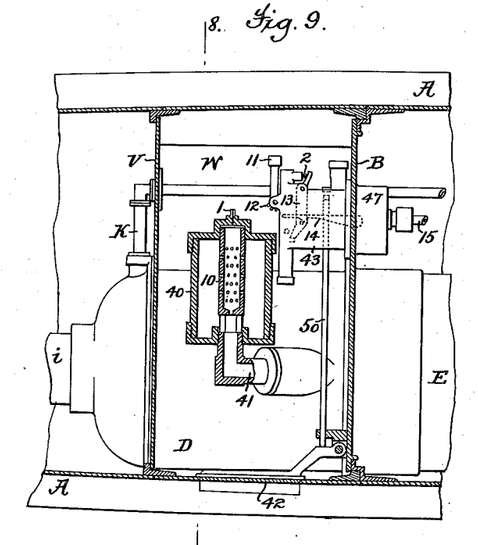
Fig. 9, is a longitudinal sectional elevation on the line 9, of Fig. 8.
Figures 10, 11:
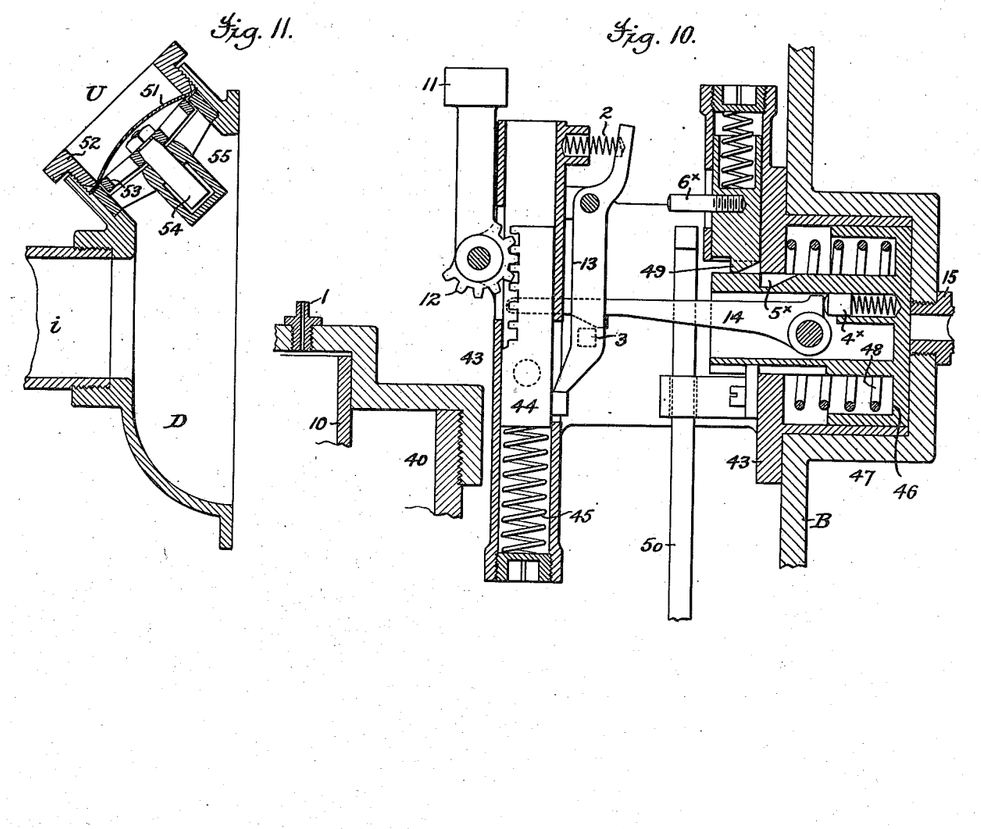
Fig. 10, is an enlarged vertical section of the trip mechanism for operating or starting the igniter.
Fig. 11, is a horizontal section of a portion of the steam generator or combustion chamber showing the emergency pressure and heat valves.

Referring to Figs. 8, 9 and 10, the igniter is contained in a chamber W closed to the remainder of the torpedo that is provided around the combustion chamber D by the torpedo casing, the partition B and another partition V. A closed cylinder 40, containing strips of smokeless gunpowder is connected by a short pipe 41 with the interior of the combustion chamber D immediately adjacent to the exposed face of the self-combustive material in the tube C, so that the flame from the smokeless gunpowder will be led to and directly impinge against the face of the material insuring its immediate and complete ignition. The smokeless powder charge is fired by detonating a fulminate cap situated on a perforated nipple 1 on the top of the cylinder 40 which communicates its fire to a charge of black gunpowder supported centrally within the smokeless powder charge by a perforated cylinder or cage 10, which in turn communicates its fire to the surrounding smokeless powder charge. The flame and the products of combustion enter the combustion chamber, ignite the self-combustive material and at the same time provide the desired pressure in said chamber for the purposes before referred to. The fulminate cap is automatically exploded by the blow of the hammer 11, under suitable spring tension released or tripped, to operate the hammer through suitable connection by the lifting or opening of a foot valve 42 in the bottom of the torpedo casing in the chamber W by impact as the torpedo strikes the water on being launched. Water is thus also admitted to the chamber, to surround the combustion chamber and prevent it and the partition B from becoming unduly heated.

The hammer 11, see Fig. 10, is pivotally mounted to a casing 43 supported by the partition B. The hammer pivot is formed with a segmental pinion 12 in mesh with the toothed rack of a plunger 44 mounted to slide in the casing under the tension of a spring 45. The spring is held under tension by a detent or lever 13 engaging a stud projecting from the rack plunger and held in engagement therewith by a suitable spring 2 pressing against its upper end. The detent or lever 13 carries a stud 3 on its side arranged at the proper time to be engaged by the hooked end of a tripping lever 14. This tripping lever is pivoted to a movable plunger or head 46 that is mounted to slide in a cylinder 47 provided by the partition B and the casing 43. The head is spring pressed in one direction by a suitable spring 48 located in the cylinder and is moved in the opposite direction by pressure of air admitted by a pipe 15 opening into said cylinder and leading from exterior of the torpedo casing and taking some of the air used in launching the torpedo. This air pressure slides the head in its cylinder, compressing the spring 48, and moves the tripping lever 14 so that its hooked end under the push of a spring-pressed plunger $4^x$ against its heel catches over the stud 3 of the detent 13 whereupon a spring-pressed latch 49 engages a recess $5^x$ in the head and holds it in set or operating position. As soon as the torpedo strikes the water in being launched the foot valve 42 is lifted and moves a rod 50 upward against a pin $6^x$, projecting from the latch 49, and raises said latch, thereby releasing the head carrying the tripping lever and allowing the spring 48 to quickly move the head and lever pulling the detent 13 free from the rack plunger so that the spring 45 may suddenly raise the rack plunger 44 rocking the hammer to impart its blow upon the cap of the igniter.

From the foregoing it will be understood that in the operation of launching the torpedo the tripping lever is first automatically set in position to release the hammer and upon the completion of the launching, that is to say, as soon as the torpedo strikes the water the tripping lever trips the hammer. The head of the combustion chamber D is provided with an emergency vent U, see Fig. 11, normally closed by a thin copper disk 51 resting against the properly shaped end of a securing cap 52 confining the disk in place. The disk is sufficiently strong to withstand more than the normal pressure within the combustion chamber, but should such pressure rise unduly and be in danger of disrupting the torpedo, the disk will be sheared off around its cap allowing the pressure to vent into torpedo body, thereby suddenly releasing the pressure in the combustion chamber with the result of immediately putting out the flame of combustion of the self-combustive material and stopping all further generation of the motor fluid so that the torpedo comes to a standstill. The emergency vent U is also provided with an annular shearing punch 53 operated to shear the copper disk 51 by an undue rise in the temperature of the motor fluid. For this purpose the annular punch has a piston or plunger 54 fitting a cylinder 55 that is constantly exposed to the motor fluid as it passes to the controlling valve R. The cylinder contains a fluid such as mercury, alcohol, or glycerin, capable of expanding when unduly heated and thus forcibly operating the plunger to shear the disk.

Figure 12:
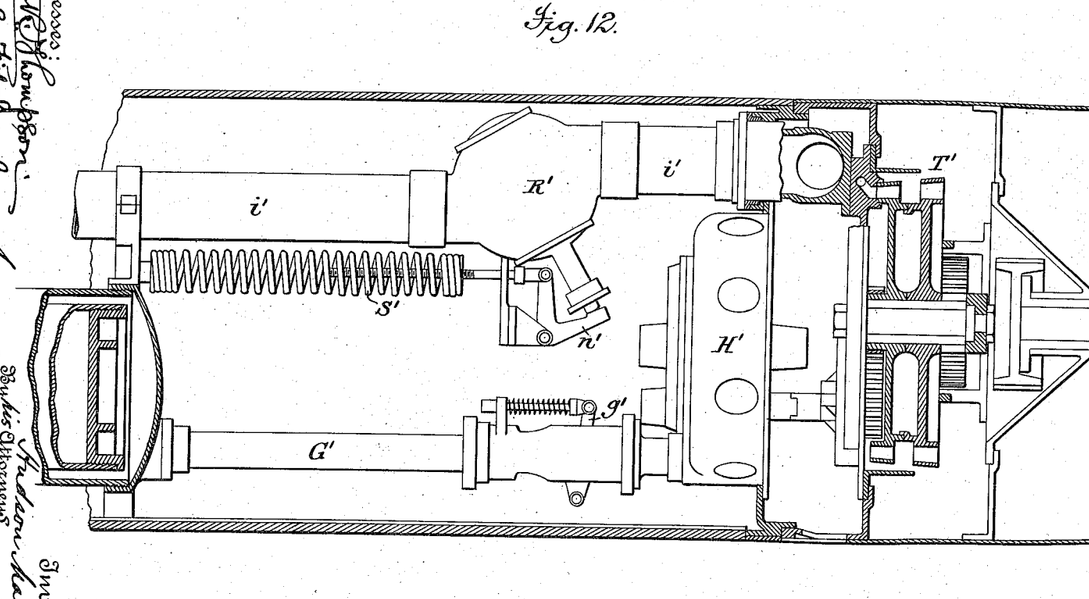
Fig. 12, is a longitudinal sectional elevation showing the invention adapted to the use of a turbine or other engine for propulsive purposes and a pump for supplying water to the steam generator.

In the form shown in Fig. 12, the motor fluid from the combustion chamber passes by a pipe $i^1$, through a controlling valve $R^1$ of the same construction heretofore described, or of any other suitable form, and thence to a turbine engine $T^1$ mounted in the after body, and of any preferred form to drive a propeller or propellers as is common in automobile torpedoes. The engine also drives a pump $H^1$ of any desired construction and of suitable capacity, delivering sea water to the feed water conduit G, past a spring-seated check valve $g^1$, and thence by the water jacket around the tube C to the combustion chamber, as in the other example of the invention. The tubes C and E and combustion chamber D in this form of the invention may be of the same construction heretofore described, except that they are changed end for end, the combustion chamber and igniter being arranged toward the forward end of the torpedo and the motor fluid pipe $i^1$ is consequently much longer than in the construction shown in Fig. 1. The controlling valve $R^1$, as in the other example, is controlled by a spring $S^1$ bearing on the valve spindle through a bell crank $n^1$.

What is claimed is:—

1. The method of generating a motive fluid for torpedoes and the like, which consists in burning a self-combustive material under pressure and controlling the rate of combustion by controlling the pressure under which the burning takes place.

2. The method of generating a motive fluid for torpedoes and the like, which consists in burning a self-combustive material under pressure due to the gases of its own combustion, and controlling the rate of combustion by controlling the pressure of said gases of combustion.

3. The method of generating a motive fluid for torpedoes and the like, which consists in burning a self-combustive fuel, combining with the gases of combustion water evaporated by the heat thereof, subjecting said fuel to the pressure of said evaporated water and gases of combustion, and controlling the rate of combustion of said fuel by controlling the said pressure.

4. The method of generating a motive fluid for torpedoes and the like, which consists in subjecting a self-combustive fuel to an initial pressure at the time of ignition, burning said fuel under pressure, and controlling the rate of combustion by controlling the pressure under which the burning takes place.

5. The method of generating a motive fluid for torpedoes and the like, which consists in igniting a self-combustive fuel under an initial pressure, and maintaining a definite rate of combustion by maintaining said fuel under an approximately constant pressure during combustion.

6. The method of producing motive fluid and propelling torpedoes thereby, which consists in forming a motive fluid consisting of mixed products of combustion and evaporated water, expanding said motive fluid between the body of the torpedo and the surrounding water thereby condensing some of the evaporated water and leaving a body of fixed gases against the water wall, and preventing the condensation of the remainder of the evaporated water in said fluid while expanding it to do work in propelling the torpedo.

7. The method of producing motive fluid and propelling torpedoes thereby, which consists in burning a self-combustive fuel, mixing the products of combustion with steam, expanding said mixture between the body of the torpedo and the surrounding water, and interposing some of said products of combustion between said expanding mixture and the surrounding water, whereby the condensation of the steam while expanding to do work is prevented.

8. The method of propelling torpedoes, which consists in providing a motive fluid of fixed gases and steam, expanding said motive fluid between the body of the torpedo and the surrounding water, and maintaining a stratum of fixed gases between said expanding motive fluid and the surrounding water, whereby the condensation of the steam in said fluid is partially prevented.

9. In a propelling means for torpedoes and torpedo boats wherein the products of combustion of a self-combustive material are used in combination with steam or other fluid as a motive fluid, means generating steam between the zone of combustion of the material and a controlling valve maintaining a predetermined rate of combustion of the material.

10. In a propelling means for torpedoes and torpedo boats wherein the products of combustion of a self-combustive material, in combination with another fluid, are utilized as a motive fluid, means absorbing heat from the products of combustion by the other fluid between the zone of combustion or combustion chamber, and a controlling means maintaining a predetermined rate of combustion.

11. In a torpedo, means for burning a self-combustive material under pressure, means supplying water thereto to be evaporated into steam, means for mixing the products of combustion of said material and the steam, and a valve maintaining a predetermined pressure and releaisng the excess to drive the torpedo.

12. In a torpedo, means for burning a self-combustive material under pressure and releasing the excess pressure to drive the torpedo, means supplying water to the burning material to be evaporated into steam and means counterbalancing the pressure on the water to permit it to flow by gravity.

13. In a torpedo, means for burning a self-combustive material under pressure and an igniter therefor automatically operated by the pressure of water against a portion of the torpedo casing.

14. In a torpedo, means for burning a self-combustive material under pressure, and an igniter therefor set to be operable by the pressure employed in launching the torpedo and a trip device operable when the torpedo enters the water.

15. In a torpedo, means for burning a solid self-combustive material under pressure, and means for igniting said material and supplying an initial pressure thereto at the time of ignition.

16. In a torpedo, means for burning a self-combustive material under pressure, a water supplying means, a valve in the water supply passage opened by the pressure, and means for igniting said material and supplying an initial pressure thereto at the time of ignition.

17. In a torpedo, means for burning a self-combustive material under pressure and maintaining a predetermined rate of combustion, a charge of powder for igniting said material and supplying an initial pressure thereto at the time of ignition and automatic means for igniting said charge of powder.

18. In a torpedo, means for burning a self-combustive material under pressure, a plurality of water tanks successively supplying water to the products of combustion of said material and taking water from the sea.

19. In a torpedo, means for burning a self-combustive material under pressure, and an emergency vent for an undue rise in such pressure.

20. In a torpedo, means for burning a self-combustive material under pressure, cooling the products of combustion by admitting water thereto, a breakable disk, and means for shearing the disk upon an undue rise in temperature of the gaseous products.

In testimony whereof I have signed this specification in the presence of two subscribing witnesses.

HUDSON MAXIM.

Witnesses:
 RALPH L. SCOTT,
 ACHSAH H. TAYLOR.